United States Patent
Schmidt et al.

(10) Patent No.: US 10,603,938 B2
(45) Date of Patent: Mar. 31, 2020

(54) METHOD FOR PRINT TUNING A PRINTER OR COPIER

(71) Applicant: Océ Printing Systems GmbH & Co. KG, Poing (DE)

(72) Inventors: Joerg Schmidt, Munich (DE); Ulrich Baeumler, Poing (DE)

(73) Assignee: Océ Printing Systems GmbH & Co. KG, Poing (DE)

( * ) Notice: Subject to any disclaimer, the term of this patent is extended or adjusted under 35 U.S.C. 154(b) by 0 days.

(21) Appl. No.: 15/278,575

(22) Filed: Sep. 28, 2016

(65) Prior Publication Data

US 2017/0087908 A1     Mar. 30, 2017

(30) Foreign Application Priority Data

Sep. 30, 2015 (DE) .................. 10 2015 116 541

(51) Int. Cl.
```
B41J 11/00      (2006.01)
B41J 29/38      (2006.01)
G06K 15/02      (2006.01)
B41J 29/393     (2006.01)
```
(52) U.S. Cl.
CPC .......... B41J 29/393 (2013.01); B41J 11/008 (2013.01); B41J 29/38 (2013.01); G06K 15/027 (2013.01); G06K 15/18 (2013.01); G06K 15/1807 (2013.01)

(58) Field of Classification Search
CPC ......... B41J 29/38; B41J 11/008; G06K 15/18; G06K 9/36
See application file for complete search history.

(56) References Cited

U.S. PATENT DOCUMENTS

| | | | |
|---|---|---|---|
| 5,204,736 A | 4/1993 | Abe | |
| 5,495,539 A | 2/1996 | Sieverding | |
| 6,977,737 B2* | 12/2005 | Lea | G06K 15/00 358/1.1 |
| 2003/0081274 A1* | 5/2003 | Yamamoto | H04N 1/407 358/504 |
| 2006/0028663 A1* | 2/2006 | Maeda | H04N 1/3875 358/1.9 |
| 2012/0075670 A1* | 3/2012 | Yamaguchi | H04N 1/00411 358/1.15 |

OTHER PUBLICATIONS

Action in DE 2015-116541.4 dated May 25, 2016, with machine translation.*

* cited by examiner

Primary Examiner — Alessandro V Amari
Assistant Examiner — Kendrick X Liu
(74) Attorney, Agent, or Firm — Schiff Hardin LLP (57) ABSTRACT

In a method for print tuning of a printer or copier, at least one first region of a first printing element to be printed is selected. Further, at least one third region of a second printing element to be printed is selected. The second printing element can be different from the first printing element. Additionally, the first and the third region can be repeatedly printed on a same proof sheet to print tune the printer or copier. The at least one printing parameter can be varied from region to region in the repeated printing of the first region, and from region to region in the repeated printing of the third region.

18 Claims, 5 Drawing Sheets

METHOD FOR PRINT TUNING A PRINTER OR COPIER

CROSS REFERENCE TO RELATED APPLICATIONS

This patent application claims priority to German Patent Application No. 102015116541.4, filed Sep. 30, 2015, which is incorporated herein by reference in its entirety.

BACKGROUND

Field

The disclosure is directed to a method for print tuning of a printer or copier, including a method in which one or more proof sheets are printed before the actual printing of a print job. In exemplary embodiments, different printing parameters can be set depending on the result of the assessment of the proof sheets.

Related Art

Copiers and printers must be tuned before the printing of a print job (i.e., a "fine tuning" for the present print job must take place). Various printing parameters are set differently depending on different settings of the printer or copier (e.g., depending on the printing substrate types and/or the primary colors that are used) in order to achieve a qualitatively high-grade print image.

For this, it is typical to proof the actual print pages of the print job multiple times, wherein respectively at least one print parameter is varied. A large number of proof sheets are thus generated that are compared manually with an OK sheet (e.g., master sheet) and that are subsequently discarded after evaluation. In particular given complex graphical elements, especially many such proofs may be necessary before the optimal setting for the printing parameters has been determined. This is necessary, in particular, when multiple "problematic" regions in which the adjustments of the printing parameters must take place very carefully are found in the print job.

What is disadvantageous with this method is that a significant proportion of spoilage (thus rejects) occurs. Moreover, the repeated starting and stopping of the printer or copier, and the removal of the proof sheets that are to be assessed, incurs a significant cost in terms of time and work. In particular, the removal of the proof sheets may be very complicated if the print sheets are arranged in series in the form of a continuous web and must accordingly be cut out.

In order to avoid the significant proportion of spoilage, a partial region of an image element can be selected and only this selected region is printed repeatedly on the proof sheet. For example, U.S. Pat. No. 5,204,736 describes the selection of two regions of one and the same image element that are then printed repeatedly onto the proof sheet with variation of at least one printing parameter. An even more precise determination of the optimal printing parameters should take place via the use of two such regions of a printing element. The adjustment of the printing parameters hereby takes place uniformly for the entire print job.

What is disadvantageous in this is that different settings of the printing parameters may be optimal in different image elements of a print job. Therefore, via the consideration of only a single image element for the entire print job, the danger exists that, although optimal settings are chosen for this printing element, these may possibly be unsuitable for other printing elements.

A similar method for print tuning of a printer or copier is described in U.S. Pat. No. 5,495,539 A.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an object of the disclosure to describe a method for print tuning of a printer or copier, where the print tuning is simplified.

According to an exemplary embodiment of the disclosure, at least one first region of a first printing element to be printed and at least one third region of a second printing element to be printed (said second printing element differing from the first printing element) are selected. For print tuning of the printer or copier, both the first and the third region are printed repeatedly on a same print sheet, wherein at least one print parameter is varied from region to region given repeated printing of the first region from region to region given repeated printing of the third region It is hereby achieved that only a single proof sheet must be printed to, which is a significant reduction in the number of proof sheets conventionally required. As a result, the spoilage is hereby reduced. Moreover, the entire print tuning process may take place in only one pass, instead of in multiple passes as conventionally performed. The printing system thus must be started and subsequently stopped again only once, whereby an additional time and work savings is additionally achieved.

Via the use of at least two regions of at least two different printing elements, it is achieved that the printing parameters may be better adapted to the different printing elements of a print job, or even to multiple print jobs. This is the case when the different regions are used for the adjustment of uniform printing parameters and even more so if different adjustments of the corresponding printing parameters are chosen for the associated printing elements based on the different regions. An even higher print quality is thus achieved.

Alternatively, more than one proof sheet may also be printed, which may in particular be necessary when the selected regions are very large and/or the printing parameter or printing parameters have many different variants, such that the selected regions must accordingly be printed very often. It may hereby be the case that not all regions to be printed may be arranged on a proof sheet, and thus multiple proof sheets are required that, however, are printed at once, i.e. without intervening stopping and restarting of the printing system. In this case, the number of the necessary proof sheets and the necessary expenditure are also minimized via the placement of multiple regions on one proof sheet.

The proof sheet or proof sheets may in particular be one sheet of the printing substrate. Alternatively, the proof sheets may also be arranged in series in the form of a continuous printing substrate web. In this case, the proof sheets are cut out of this continuous web for evaluation before the actual printing of the print job. In particular, in this case the necessary expenditure is significantly minimized via the use of only one proof sheet.

In an exemplary embodiment of the disclosure, not only is a first region of the first printing element selected, but rather an additional second region of the first printing element is also selected. For print tuning of the printer or copier, the second region is also printed repeatedly on the same proof sheet, like the first and third region, wherein the at least one printing parameter is also varied from region to region given repeated printing of the second region. In this way, multiple problem zones of the first print object may be used for the fine adjustment so that a particularly high quality printing is achieved.

In an exemplary embodiment, it is advantageous if at least one fourth region is selected from the second printing element in addition to the third region, wherein the fourth region is printed repeatedly on the same proof sheet, like the first and third region, for print tuning of the printer or copier. Given repeated printing of the fourth region, the at least one printing parameter is also varied from region to region. It is hereby achieved that, as given the second image element, multiple problem zones may be selected so that here as well as uniformly high-grade fine adjustment may take place.

In an exemplary embodiment of the disclosure, more than two regions may also be selected, for example three regions from which the two printing elements are selected. Moreover, it is alternatively also possible that more than two printing elements—for example three printing elements—are selected, from which respectively at least one region for the print tuning is then selected in turn and is printed on the proof sheet in corresponding variation of the at least one printing parameter.

The more regions and the more printing elements that are used, the more problem zones that may be considered in the print tuning, such that an even higher-grade printing takes place.

In an exemplary embodiment of the disclosure, the first and the second printing element are selected from the same print job. It is hereby achieved that optimal settings of the printing parameters may be achieved for this print job via the use of multiple printing elements.

In an exemplary embodiment of the disclosure, the first and the second printing element may also be selected from different print jobs. It is hereby achieved that the print tuning may be implemented for at least two print jobs in one pass of the method. This is possible, in particular, when settings of the printer or copier are not changed between the print jobs, in particular if the printing substance types or the primarily colors that are used are not changed. It is thus achieved that—even given the printing of multiple print jobs in succession, with various problematic regions—a print tuning may take place via only a single proof sheet. The necessary number of proof sheets is thus further reduced.

In an exemplary embodiment, the printing elements can be, for example, images, graphics or texts. In an exemplary embodiment, a printing element may be any element embedded as a single object into a print job.

After printing the proof sheet, the proof sheet can be evaluated manually, or automatically with the aid of a measurement system. It is hereby determined which of the various printing parameter adjustments lead to the best print result. The printing parameters are subsequently adjusted for the execution of the actual print job or, when the first and the second printing element are taken from different print jobs, these multiple print jobs are adjusted accordingly.

In an exemplary embodiment, the setting of the printing parameters may take place uniformly for the entire print job or possible multiple complete print jobs. It is thus achieved that no variations of the printing parameters are necessary during the print job or during the print jobs, and nevertheless a compensated optimal adjustment of the printer or copier is provided via the use of multiple printing elements, and thus a qualitatively high-grade print image is generated.

In an exemplary embodiment, the printing parameters that are used may also be set differently for the different printing elements from which the first and the third region have been selected. The selection and adjustment of the printing parameters for the different printing elements hereby, in particular, takes place using the associated regions on the proof sheet. That is, the printing parameters for the first printing element are set using the evaluation of the first region, and the printing parameters for the second printing element are set depending on the evaluation of the third region. It is hereby achieved that—even when the individual printing elements for a qualitatively high-grade print image require very different printing parameter settings—this may be implemented without compromises, and thus a very high-grade printing is provided.

In an exemplary embodiment, the decision of how the optimal adjustment of the printing parameters for one of the selected regions or multiple selected regions may be based on both the individual impression and the total impression of the various regions.

In a non-limiting example, the contrast, different printing modes, dye densities and/or the number of layers may be used as printing parameters.

In an exemplary embodiment of the disclosure, at least one print page of a print job (and in some embodiments, all print pages of a print job) is displayed on a screen. Using a proofing device including a print proofing computer program, an operator may mark a region on the print page or the print pages. The marked region can then be used as a first region for the print tuning and is accordingly printed multiple times on the proof sheet. In an exemplary embodiment, the proofing device is a computer configured to execute the print proofing computer program to perform print proofing operations. The proofing device and/or computer can include processor circuitry configured to perform print proofing operations, including executing the print proofing computer program.

Via this computer program, on the screen the operator may, in particular, arbitrarily select the position of the selected region on the proof sheet, for example via drag and drop.

The operator may accordingly also select and position the third region, and if applicable, the second and fourth region.

Moreover, the operator may determine which printing parameters should be varied how. The corresponding necessary frequency with which the selected region is printed on the proof sheet is then set depending on the number of different resulting variants.

In an exemplary embodiment, the operator may freely select the arrangement of the different selected regions on the proof sheet or proof sheets. Moreover, the operator may make specifications for the printing parameter settings that differ from region to region. In particular, the count of how many of each selected region must be respectively printed results from the number of different selected settings of these printing parameters.

In an exemplary embodiment, it is advantageous if, next to the individual regions, the adjusted values of the printing parameter or printing parameters are printed onto the proof sheet. This has the advantage that, given a manual evaluation of the proof sheet, an association of the selected printing parameter settings with the individually printed regions is possible and errors in this regard are avoided.

In an exemplary embodiment, before the printing of one or more print jobs with the aid of a printer or copier, this printer or copier can be finely adjusted. A fine adjustment can take place in which various printing parameters are adapted to the print job or the print jobs such that a qualitatively high-grade print image is achieved. The fine adjustment, which is also designated as a print tuning, can be performed, in particular, when complex graphical elements—for example images—should be printed that may include problematic regions. For example, these may be regions in which only slight contrast differences exist between different objects; regions in which the observer typically has a clear expectation of the appearance and immediately recognizes deviations in the color impression; regions in which elements that are difficult to print (for example inverted writing) are included; larger single-color regions; regions with sharp color transitions; and/or regions which have the greatest demands for color precision, for example corporate logos and marks.

In an exemplary embodiment, the contrast, different printing modes, dye densities and/or the number of layers may be used as printing parameters. The printing parameters are not limited to these examples and the printing parameters can be one or more other parameters as would be understood by one of ordinary skill in the art.

Figure 1:
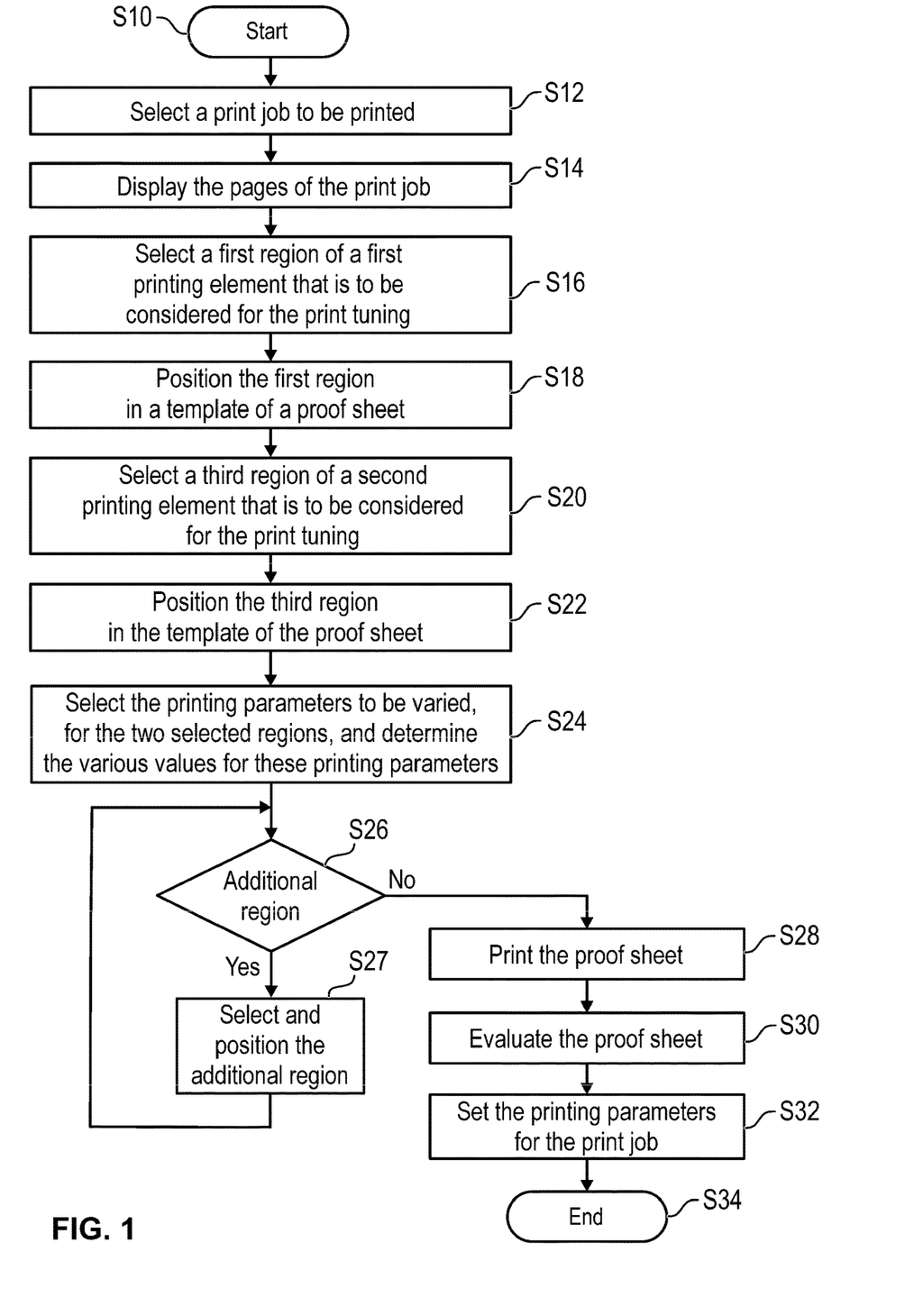
FIG. 1 illustrates a workflow diagram of a method for print tuning a printer or copier according to an exemplary embodiment of the present disclosure.

FIG. 1 illustrates a workflow diagram of a method for print tuning of a printer or copier according to an exemplary embodiment of the present disclosure. In this embodiment, a precise fine adjustment may take place in a particularly simple manner.

After the method was started in Step S10, the selection of a print job to be printed takes place in Step S12. Such a print job may be comprised of only one print page to be printed or a plurality of print pages to be printed. Each of the print pages may in turn include a printing element or multiple printing elements, wherein the printing elements may be graphics, images or text components, for example.

At least one of these print pages of the print job is subsequently displayed on the screen in Step S14. In an exemplary embodiment, all print pages of the print job that are to be printed are displayed so that an operator may consider all pages. All pages may hereby be displayed simultaneously on the screen either in corresponding miniature form, or the operator may select between the individual pages, for example via scrolling.

The selection of at least one first region of a first printing element that is to be considered for the print tuning is performed by the operator on the screen in Step S16. The operator hereby in particular selects as a first printing element a printing element that comprises at least one region which she considers to be problematic, and then selects this problematic region as a first region for the fine adjustment. The selection may in particular take place via a marking of the corresponding region. In an exemplary embodiment, a special computer program, such as a print proofing computer program, is provided which enables the selection of the regions to be considered for the print tuning. In particular, a marking of the first region within this computer program may take place via a computer mouse by drawing a corresponding box.

A positioning of the selected first region in a template of the proof sheet subsequently takes place in Step S18. In an exemplary embodiment, the template of a proof sheet is schematically depicted on a display (e.g., a display of a proofing device or the computer screen of a computer), on which template the operator may establish the desired position of the selected regions. In particular, the positioning may simply take place via "drag and drop".

In step S20, the operator will subsequently select a third region of a second printing element of the same print job, which third region is likewise to be considered for the print tuning. The operator in particular hereby in turn selects a problematic region as a third region.

Analogous to as before in Step S18 for the first region, a positioning of the third region in the template of the proof sheet subsequently takes place in Step S22. This may be implemented similar to the operations of Step S18 for the first region. The selection in Step S20 may likewise be take place analogously via a computer program, as was described in Step S16 for the first region.

Alternatively, in an exemplary embodiment, it is also possible that initially both the first and the third region are sought, and then only the first and the third region are positioned in the template of the proof sheet.

In Step S24, the operator subsequently selects which printing parameters should be varied on the proof sheet. In an exemplary embodiment, a different variation of the printing parameters or the same variation of the printing parameters may hereby take place for the first and the third region. The operator also selects which concrete values should be used for the individual printing parameters. In particular, the necessary count of how often the first and the third region must respectively be printed on the proof sheet then results from this. In particular, a respective region on the proof sheet is necessary for every different variation of the printing parameter for both the first and the third region, wherein the printing parameter is respectively, accordingly set differently from region to region. Insofar as sufficient space is on one proof sheet, all regions are positioned on this one proof sheet. In an exemplary embodiment, with the aid of the computer program the operator may also establish at which locations of the proof sheet the individual regions with the differing values for the printing parameters should be positioned.

In an alternative embodiment of the disclosure, in Step S20 the establishment of the printing parameters to be varied is also not performed manually by an operator among the values used for this; rather, instead fixed, predetermined values may be automatically used for the preset printing parameters.

In Step S26, it is subsequently determined whether an additional region for the print tuning should still be considered. This additional region may be taken from the first, the second or an additional printing element. The more regions and the more printing elements that are used, the more precisely that the fine adjustment may take place.

If it is established in Step S26 that yet another region should be selected, the workflow continues with Step S27, in which the operator initially selects the additional region to be considered for the K print tuning and positions said region accordingly on the proof sheet. The workflow is subsequently continued again with Step S26. In contrast to this, if it was established in Step S26 that no additional region should be selected, the workflow continues with Step S28, in which the proof sheet is printed.

After the proof sheet was printed, the proof sheet is evaluated in Step S30. This may take place either manually or automatically via corresponding measurement devices. Which settings of the individual printing parameters lead to the best print result is hereby established for one or more printing parameters, either using individual criteria or the overall impression.

In Step S32, the printing parameters are subsequently adjusted corresponding to the optimal settings previously determined in Step S30, before the method is ended in Step S34.

The determination of the optimal settings in Step S30 and the corresponding adjustment in Step S32 may hereby take place uniformly on the one hand for the entire print job. In this case, both the regions of the first region and of the third region are taken into account in the determination of the optimal settings, and the setting is chosen for printing parameters that—considered globally, thus for both printing elements—represent the optimal compromise.

In an exemplary embodiment, on the other hand, the evaluation of the proof sheet—and beyond this the selection of the optimal settings for the printing parameters via the corresponding adjustment—also respectively takes place individually for the respective printing elements. In this case, the adjustments of the printing parameters for the printing of the first printing element in particular take place depending on the evaluation of the first region, and for the second printing element depending on the evaluation of the third region.

Via the previously described method, it is achieved that the number of the necessary proof sheets is minimized. In an exemplary embodiment, only one proof sheet is necessary.

It is hereby also achieved that the printer or copier does not need to be started and stopped again repeatedly. In particular, given continuous webs the proof sheet does not need to be elaborately cut out after every pass. In addition to saving on proof sheets, a savings in terms of time and work is thus achieved.

In comparison with the selection of only one region or of multiple regions from only one printing element, the use of at least two regions made up of at least two printing elements also enables that a qualitatively high-grade printing may take place even given very different printing elements, in particular in that a compromise solution for the settings of the printing parameters is found that leads to good results for both printing elements, or in that different settings of the printing parameters are chosen for the various printing elements.

Figure 2:
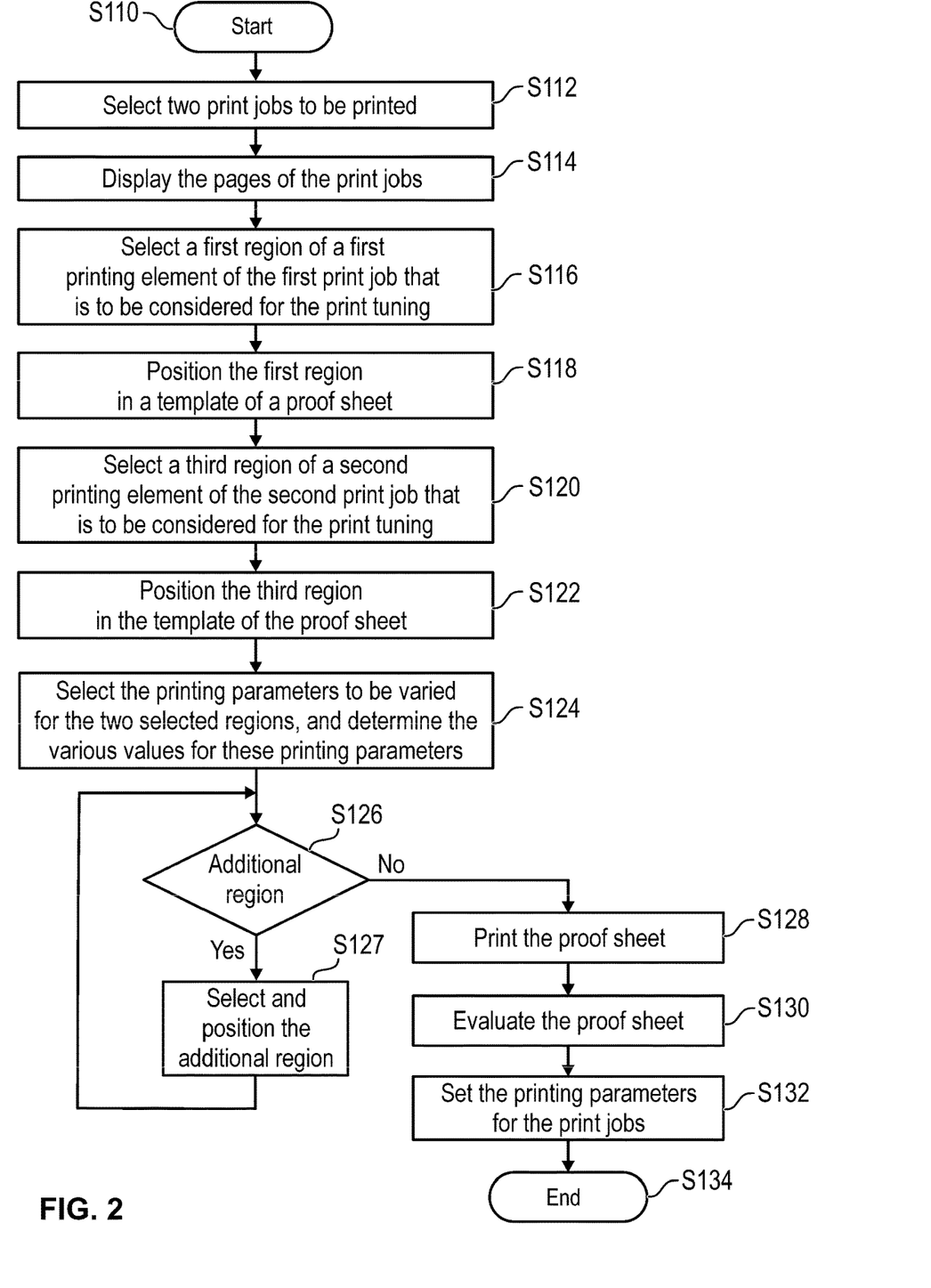
FIG. 2 illustrates a workflow diagram of a method for print tuning a printer or copier according to an exemplary embodiment of the present disclosure.

FIG. 2 illustrates a method for print tuning of a printer or copier according to an exemplary embodiment. This method is similar to the method illustrated in FIG. 1 but differs from the method in that two print jobs are selected in Step S112, and subsequently, in Steps S116 and S120, the first printing element from which the first region is chosen from the first print job and the second printing element from which the third region is selected is chosen from the second print job.

Via the selection of the two printing elements from different print jobs it is achieved that the print tuning of the printer or copier for both print jobs may take place with only one proof sheet or only a single pass of the method, and nevertheless a qualitatively high-grade print image may take place. Both the determination of the settings of the printing parameters and the corresponding adjustment may hereby take place such that the same settings are used for both print jobs, and such that different parameter settings are used for the different print jobs, wherein the settings for the first print job that are determined to be optimal depending on the first region and the settings for the second print job that are determined to be optimal depending on the evaluation of the third region are used.

Figure 3:
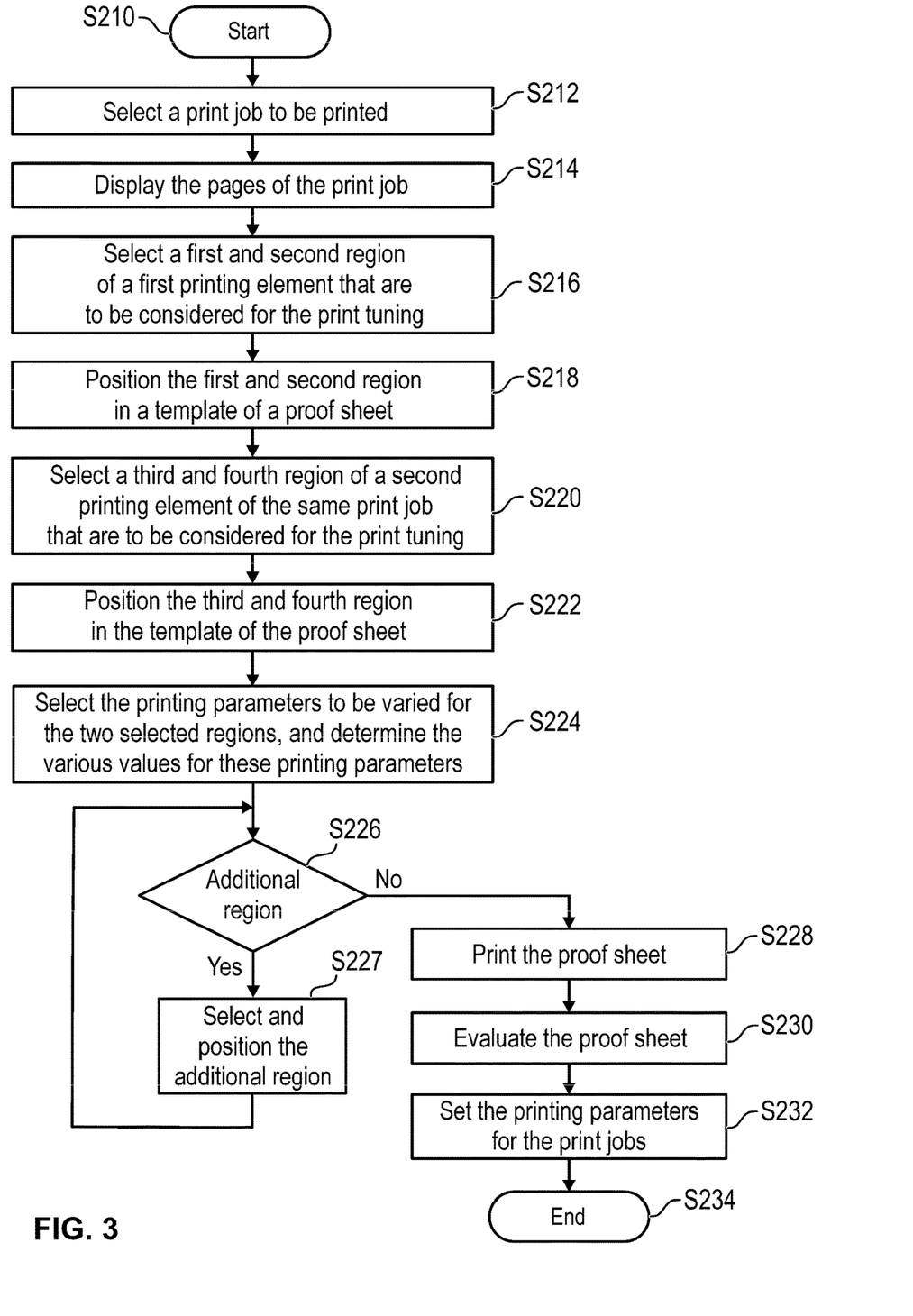
FIG. 3 illustrates a workflow diagram of a method for print tuning a printer or copier according to an exemplary embodiment of the present disclosure.

FIG. 3 illustrates a workflow diagram of a method for print tuning of a printer or copier according to an exemplary embodiment. The method according to FIG. 3 is similar to the method illustrated in FIG. 1 but differs in that, in Step S216, not only a first region, but additionally a second region are selected from the first printing element. Additionally, in Step S220, not only a third region but additionally also a fourth region are selected from the second printing element. Via the use of two respective regions for each printing element it is achieved that different problematic regions within the printing element may also be taken into account in the subsequent determination of the optimal setting of the printing parameters.

In an exemplary embodiment of the disclosure, the first and second region, or the third and fourth region, may also not be selected and subsequently positioned in a common step; rather, the selection of the four regions overall may take place in iterative succession.

In an exemplary embodiment, it is possible that two regions are selected only for the first printing element or only for the second printing element.

Likewise, it is alternatively possible that more than two regions—for example three or four regions—are respectively selected and accordingly taken into account for the first and/or second printing element.

Figure 4:
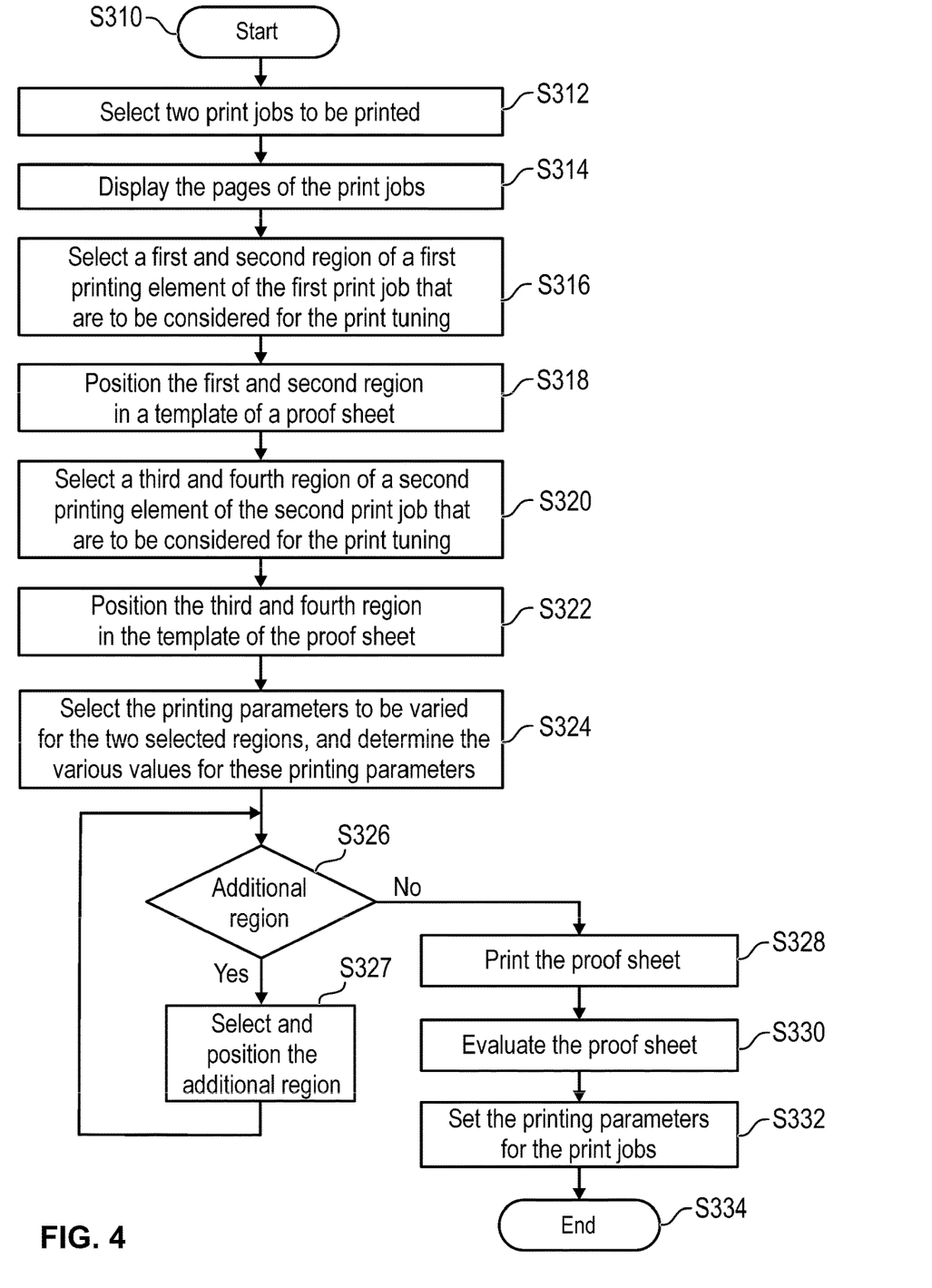
FIG. 4 illustrates a workflow diagram of a method for print tuning a printer or copier according to an exemplary embodiment of the present disclosure.

FIG. 4 illustrates a workflow diagram of a method for print tuning of a printer or copier according to an exemplary embodiment. The method illustrated in FIG. 4 is similar to the method shown in FIG. 2 but differs in that—as previously described in connection with FIG. 3 for the third embodiment—two regions are respectively used for the two printing elements.

Figure 5:
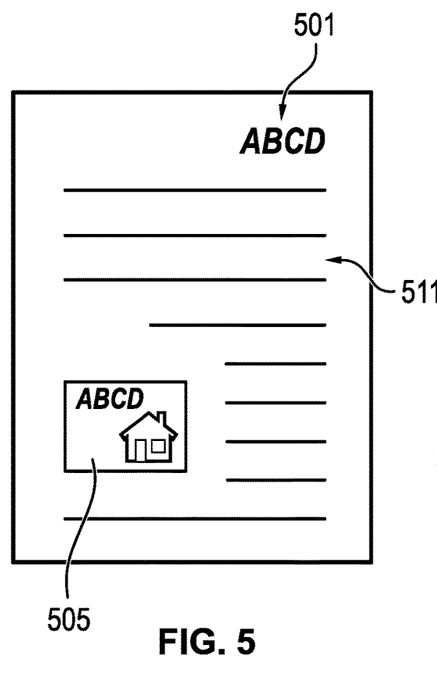
FIG. 5 illustrates a schematic depiction of a first print job according to an exemplary embodiment of the present disclosure.
Figure 6:
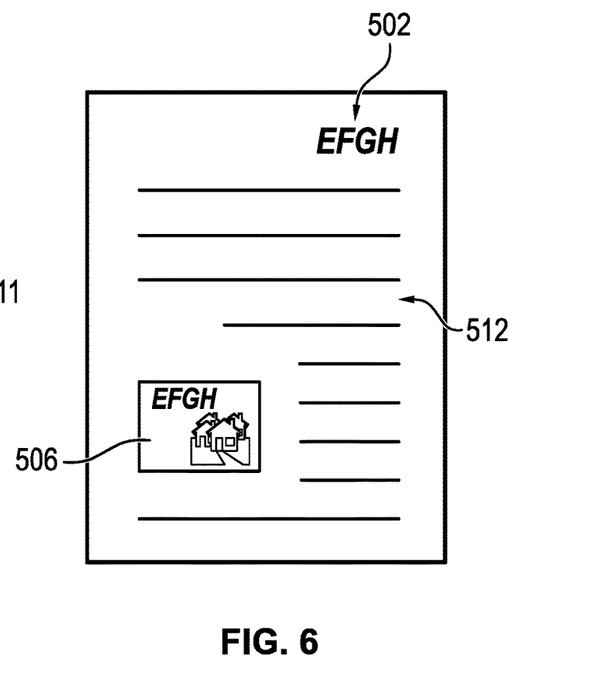
FIG. 6 illustrates a schematic depiction of a second print job according to an exemplary embodiment of the present disclosure.
Figure 7:
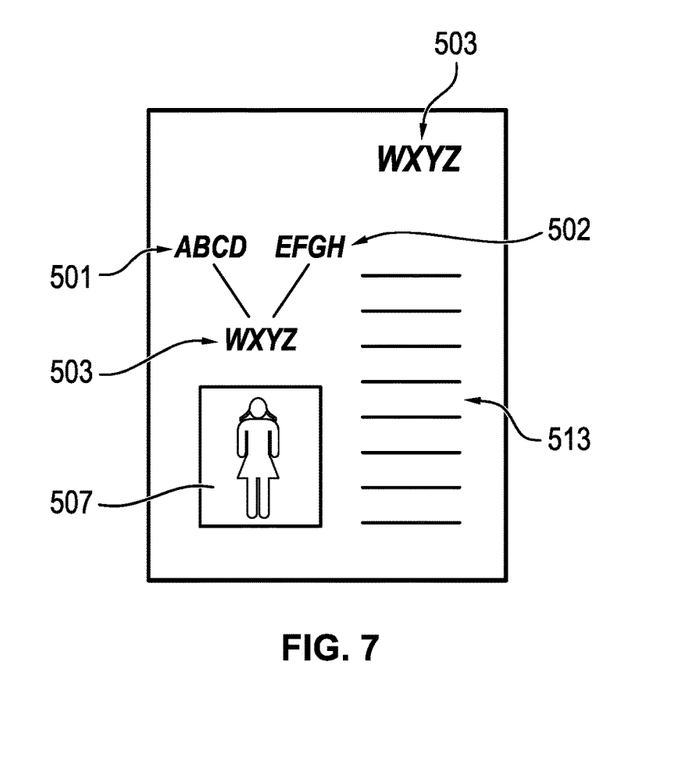
FIG. 7 illustrates a schematic depiction of a third print job according to an exemplary embodiment of the present disclosure.

Schematic depictions of print jobs via which the application of a printing proofing method is performed are shown in FIGS. 5-7. The three print jobs can be, for example, respectively a brochure for presentation of the companies ABCD, EFGH and WXYZ on the occasion of the formation of the joint venture WXYZ by ABCD and EFGH.

The brochure of the first print job that is shown in FIG. 5 has a corporate logo 501 of the company ABCD that is maintained in a first corporate color which can be precisely defined. An image 505 is also present in which the corporate logo of the company ABCD is likewise included in the corresponding first corporate color. Moreover, the brochure of the first print job has a continuous text 511, such as in a text document (e.g., Word document).

The second print job shown in FIG. 6 likewise has a corporate logo 502 of the company EFGH in a defined second corporate color that is different than the first corporate color. Likewise, an image 506 with the logo of the company EFGH in the second corporate color as well as a continuous text 512 in the document are also included in the brochure of the second print job.

In the brochure of the joint venture WXYZ that is shown in FIG. 7, the corporate logo 503 of the joint venture WXYZ in a third corporate color is included in addition to the corporate logo 501 of the company ABCD in the first corporate color and the corporate logo 502 of the company EFGH in the second corporate color. An image 507 is also depicted which shows a model whose articles of clothing have the third corporate colors. Moreover, this third print job also has a continuous text 513, such as in a Word Document format.

Given the first print job shown in FIG. 5, in the printing, a special value must be placed on the first corporate color in the logo 501 (which is included in, for example, a PDF document) and the same corporate color in the image 505 (which is included in the print job as, for example, a JPG). If the first print job is thus printed as an individual print job (meaning that the print tuning takes place only for this print job), in particular two regions are selected for the print tuning, namely on the one hand the logo 501 and on the other hand the image 505, or in particular the section of the image 505 in which the corporate logo is shown. It is hereby ensured that the first corporate color which is defined precisely within the scope of the corresponding corporate identity is depicted very precisely in the logo.

In the individual print tuning for the second print job, the logo 502 and the image 506 are, as problematic regions, accordingly selected as corresponding regions for the print tuning.

In contrast to this, upon printing the third print job according to FIG. 7 not only two regions but rather optimally four regions are selected for the print tuning, namely the respective logos 501 through 503 and the image 507.

In an exemplary embodiment, in the three print jobs respectively, only the logos 501 through 503 may also be selected as regions for the print tuning since the precise presentation of the colors of the logos may be of less importance compared to JPG images and the continuous text because the corporate color is contrasted with other elements of the image, for example green buildings, blue sky or green plants, and a different appearance may hereby be evoked.

Moreover, the printing of the respective corporate colors in the images 505 through 507 may be particularly difficult because, for example, in the image 507—the corporate color on the clothing changes due to the light and shadows.

In contrast to this, if all three print jobs should be printed together as one print job—meaning that only one print tuning should take place in advance for all three print jobs—the respective problem zones can be selected from all three print jobs as the regions for the print tuning. In an exemplary embodiment, the corporate logo 501 and the image 505 from the first print job, the corporate logo 502 and the image 506 from the second print job, and the corporate logo 503 and the image 507 from the third print job can be selected as regions forming the basis for the print tuning. It may thus be achieved that all three brochures that are required together (for example at a convention) due to the joint venture are printed in high quality; in particular, the corporate colors established precisely via the respective corporate identity are accordingly rendered exactly.

An additional practical example for the application of the previously described method is the printing of folding boxes to package, for example, shavers. According to experience, the shaving foam depicted on the box appears as a particular problem zone. The problem is, in particular, that every observer has a very concrete expectation of the shaving foam, namely that it is expected that it is brilliantly white. Moreover, such elements on the boxes are often depicted by designers even whiter and more brilliant than in reality, since emotions should hereby be conveyed and, for example, freshness should be suggested, which animates the potential buyer to make a purchase.

Given the printing of such folding boxes with depicted shaving foam, across the known print tuning methods the problem exists that the foam is hinted in red and/or yellow, and in every instance is not as "fresh" as in the tuning exemplar from an offset machine.

These problems may be solved with the previously described method simply in that, for example, the shaving foam is selected as one of the regions that form the basis for the print tuning. Corporate logos included on the folding box may in turn be selected as additional regions, for example.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

For the purposes of this discussion, processor circuitry can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein. In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

REFERENCE LIST

S10 to S334 method step
501 corporate logo in first corporate color
502 corporate logo in second corporate color
503 corporate logo in third corporate color
505 image with logo in first corporate color
506 image with logo in second corporate color
507 image with model in third corporate color
511 to 530 continuous text as in a text document (e.g. Word document)

What is claimed is:

1. A parameter setting method for a printer or copier, comprising:
    selecting a region of a first printing element to be printed;
    selecting a region of a second printing element to be printed, the second printing element being different from the first printing element;
    on a same proof sheet, repeatedly printing:
        the region of the first printing element a first quantity of times, at least one printing parameter being varied for each respective printed region of the first quantity of printed regions of the first printing element; and
        the region of the second printing element a second quantity of times, the at least one printing parameter being varied for each respective printed region of the second quantity of printed regions of the second printing element;
    after the printing of the proof sheet, evaluating the proof sheet using a measurement system to determine at least one parameter setting; and
    automatically setting, based on the evaluation, the at least one printing parameter to the determined at least one parameter setting for an entire print job.

2. The method according to claim 1, further comprising:
    selecting a second region of the first printing element; and
    repeatedly printing the second region a third quantity of times on the same proof sheet,
    wherein the at least one printing parameter is also varied for each respective printed region of the third quantity of printed regions of the second region of the first printing element.

3. The method according to claim 2, further comprising:
    selecting a second region of the second printing element;
    repeatedly printing the second region a fourth quantity of times on the same proof sheet,
    wherein the at least one printing parameter is also varied for each respective printed region of the fourth quantity of printed regions of the second region of the second printing element.

4. The method according to claim 1, further comprising:
    selecting a second region of the second printing element;
    repeatedly printing the second region a fourth quantity of times on the same proof sheet,
    wherein the at least one printing parameter is also varied for each respective printed region of the fourth quantity of printed regions of the second region of the second printing element.

5. The method according to claim 1, wherein the first and the second printing elements are selected from a same print job.

6. The method according to claim 1, wherein the first and the second printing elements are selected from different print jobs.

7. The method according to claim 1, wherein the first printing element and the second printing element are images, graphics and/or texts.

8. The method according to claim 1, wherein:
    the automatic evaluating of the proof sheet comprises evaluating the region of the first printing element on the proof sheet and evaluating the region of the second printing element on the proof sheet; and
    the automatic setting of the at least one printing parameter comprises:
        setting one or more printing parameters for the first printing element based on the evaluation of the region of the first printing element on the proof sheet; and setting one or more printing parameters for the second printing element based on the evaluation of the region of the second printing element on the proof sheet.

9. The method according to claim 1, further comprising:
displaying the first printing element and the second printing element on a screen; and
marking at least two regions, wherein the marked at least two regions are used as the selected regions of the first and second printing elements, respectively.

10. The method according to claim 1, further comprising printing corresponding set values of the at least one printing parameter on the proof sheet for each of the printed regions of the first printing element and/or for each of the printed regions of the second printing element.

11. A non-transitory computer-readable storage medium with an executable program stored thereon, wherein the program instructs a processor to perform the method of claim 1.

12. A printer or copier comprising a proofing device including processor circuitry that is configured to perform the method of claim 1 to print tune the printer or the copier.

13. The method according to claim 1, wherein the first quantity and the second quantity are different.

14. A parameter setting method for a printer or copier, comprising:
selecting a first region and a second region of a first printing element to be printed;
selecting a third region and a fourth region of a second printing element to be printed, the second printing element being different from the first printing element;
varying, a respective quantity of times, at least one printing parameter for one or more of the first, the second, the third, and the fourth regions;
on a same proof sheet, repeatedly printing the first, the second, the third, and the fourth regions the respective quantity of times, wherein the repeatedly printed regions of the one or more of the first, the second, the third, and the fourth regions have different variations of the at least one printing parameter;
after the printing of the proof sheet, evaluating the proof sheet using a measurement system to determine at least one parameter setting; and
automatically setting, based on the evaluation, the at least one printing parameter to the determined at least one parameter setting for an entire print job.

15. The method according to claim 14, wherein the varying at least one printing parameter comprises varying at least one printing parameter for each of the first, the second, the third, and the fourth regions.

16. A parameter setting method for a printer or copier, comprising:
selecting a region of a first printing element to be printed;
selecting a region of a second printing element to be printed, the second printing element being different from the first printing element;
on a same proof sheet, repeatedly printing:
the region of the first printing element a first quantity of times, a first printing parameter being varied for each respective printed region of the first quantity of printed regions of the first printing element; and
the region of the second printing element a second quantity of times, a second printing parameter being varied for each respective printed region of the second quantity of printed regions of the second printed element, wherein repeatedly printed regions of the first and the second regions have different variations of the first and the second printing parameters, respectively;
after the printing of the proof sheet, evaluating the proof sheet using a measurement system to determine at least one parameter setting; and
automatically setting, based on the evaluation, the at least one printing parameter to the determined at least one parameter setting for an entire print job.

17. The method according to claim 16, wherein the first printing parameter and the second printing parameter are different.

18. The method according to claim 16, wherein the first printing parameter and the second printing parameter are a same printing parameter.

* * * * *